(12) United States Patent
Lee

(10) Patent No.: US 8,869,192 B2
(45) Date of Patent: *Oct. 21, 2014

(54) METHOD FOR SETTING TV ENVIRONMENT THROUGH USER AUTHENTICATION AND APPARATUS THEREOF

(75) Inventor: Jung-won Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 38 days.

This patent is subject to a terminal disclaimer.

(21) Appl. No.: 13/330,343

(22) Filed: Dec. 19, 2011

(65) Prior Publication Data

US 2012/0167131 A1 Jun. 28, 2012

Related U.S. Application Data

(63) Continuation of application No. 10/202,636, filed on Jul. 25, 2002, now Pat. No. 8,104,057.

(30) Foreign Application Priority Data

Dec. 11, 2001 (KR) .................................. 2001-78180

(51) Int. Cl.
| | |
|---|---|
| *H04N 7/16* | (2011.01) |
| *H04N 21/475* | (2011.01) |
| *H04N 21/485* | (2011.01) |
| *H04N 5/445* | (2011.01) |

(52) U.S. Cl.
CPC ....... *H04N 21/4858* (2013.01); *H04N 21/4753* (2013.01); *H04N 21/4751* (2013.01); *H04N 21/4852* (2013.01); *H04N 7/163* (2013.01); *H04N 5/445* (2013.01)
USPC .................. 725/30; 725/25; 725/28; 713/183; 713/185; 713/186

(58) Field of Classification Search
CPC ........................ H04N 21/4182; H04N 21/4755
USPC .................. 725/25, 28, 30; 713/183, 185, 186
See application file for complete search history.

(56) References Cited

U.S. PATENT DOCUMENTS

| 5,410,598 A | 4/1995 | Shear |
|---|---|---|
| 5,550,575 A | 8/1996 | West et al. |

(Continued)

FOREIGN PATENT DOCUMENTS

| JP | 2000-196970 | 7/2000 |
|---|---|---|
| KR | 10-1997-0024956 | 5/1997 |
| KR | 10-1998-027644 | 8/1998 |
| KR | 1999-0068942 | 9/1999 |
| KR | 10-1999-0086216 | 12/1999 |
| KR | 10-2001-0001085 | 1/2001 |

OTHER PUBLICATIONS

Windows XP Office XP, Jun. 2001.

(Continued)

*Primary Examiner* — Pankaj Kumar
*Assistant Examiner* — Sahar Baig
(74) *Attorney, Agent, or Firm* — Staas & Halsey LLP

(57) ABSTRACT

A method and apparatus for setting a TV operation environment for users submitting authorizing passwords. The method of setting a user environment of a television (TV) includes displaying a plurality of icons of Identifications (IDs) for respective users, each of the IDs corresponding to an operation environment for a user. If an ID icon is selected among the displayed icons, a password corresponding to the selected ID icon is authenticated, and if a user is authenticated by the password, a preset operation mode for the user is set.

1 Claim, 3 Drawing Sheets

(56) References Cited

U.S. PATENT DOCUMENTS

| | | | |
|---|---|---|---|
| 5,717,955 A * | 2/1998 | Swinehart | 710/62 |
| 5,892,900 A | 4/1999 | Ginter et al. | |
| 5,973,683 A | 10/1999 | Cragun et al. | |
| 6,163,272 A * | 12/2000 | Goode et al. | 725/30 |
| 6,530,083 B1 * | 3/2003 | Liebenow | 725/46 |
| 6,564,005 B1 * | 5/2003 | Berstis | 386/239 |
| 6,701,523 B1 | 3/2004 | Hancock et al. | |
| 6,745,223 B1 | 6/2004 | Nobakht et al. | |
| 7,051,360 B1 | 5/2006 | Ellis et al. | |
| 7,080,399 B1 | 7/2006 | Yanagawa et al. | |
| 7,376,751 B2 * | 5/2008 | Gautier | 709/245 |
| 2002/0049738 A1 | 4/2002 | Epstein | |
| 2003/0190136 A1 | 10/2003 | Yamamoto | |
| 2003/0237093 A1 | 12/2003 | Marsh | |

OTHER PUBLICATIONS http://petri.co.il/images/xp_welcome_screen.jpg.
http://www.microsoft.com/presspass/presspass/press/2001/aug01/08-24WinXPRTMPR.mspx.
U.S. Appl. No. 10/202,636, filed Jul. 25, 2002, Jung-won Lee, Samsung Electronics Co. Ltd.
U.S. Office Action mailed May 11, 2007 in Parent U.S Appl. No. 10/202,636.
U.S. Office Action mailed Oct. 17, 2007 in Parent U.S. Appl. No. 10/202,636.
U.S. Advisory Action mailed Feb. 12, 2008 in Parent U.S. Appl. No. 10/202,636.
U.S. Office Action mailed Jun. 12, 2008 in Parent U.S. Appl. No. 10/202,636.
U.S. Office Action mailed Jan. 7, 2009 in Parent U.S. Appl. No. 10/202,636.
U.S. Office Action mailed Jul. 20, 2009 in Parent U.S. Appl. No. 10/202,636.
U.S. Office Action mailed Jan. 5, 2010 in Parent U.S. Appl. No. 10/202,636.
U.S. Office Action mailed Jul. 8, 2010 in Parent U.S. Appl. No. 10/202,636.
U.S, Advisory Action mailed Oct. 20, 2010 in Parent U.S. Appl. No. 10/202,636.
U.S. Office Action mailed Dec. 21, 2010 in Parent U.S. Appl. No. 10/202,636.
U.S. Notice of Allowance mailed Sep. 22, 2011 in Parent U.S. Appl. No. 10/202,636.

* cited by examiner

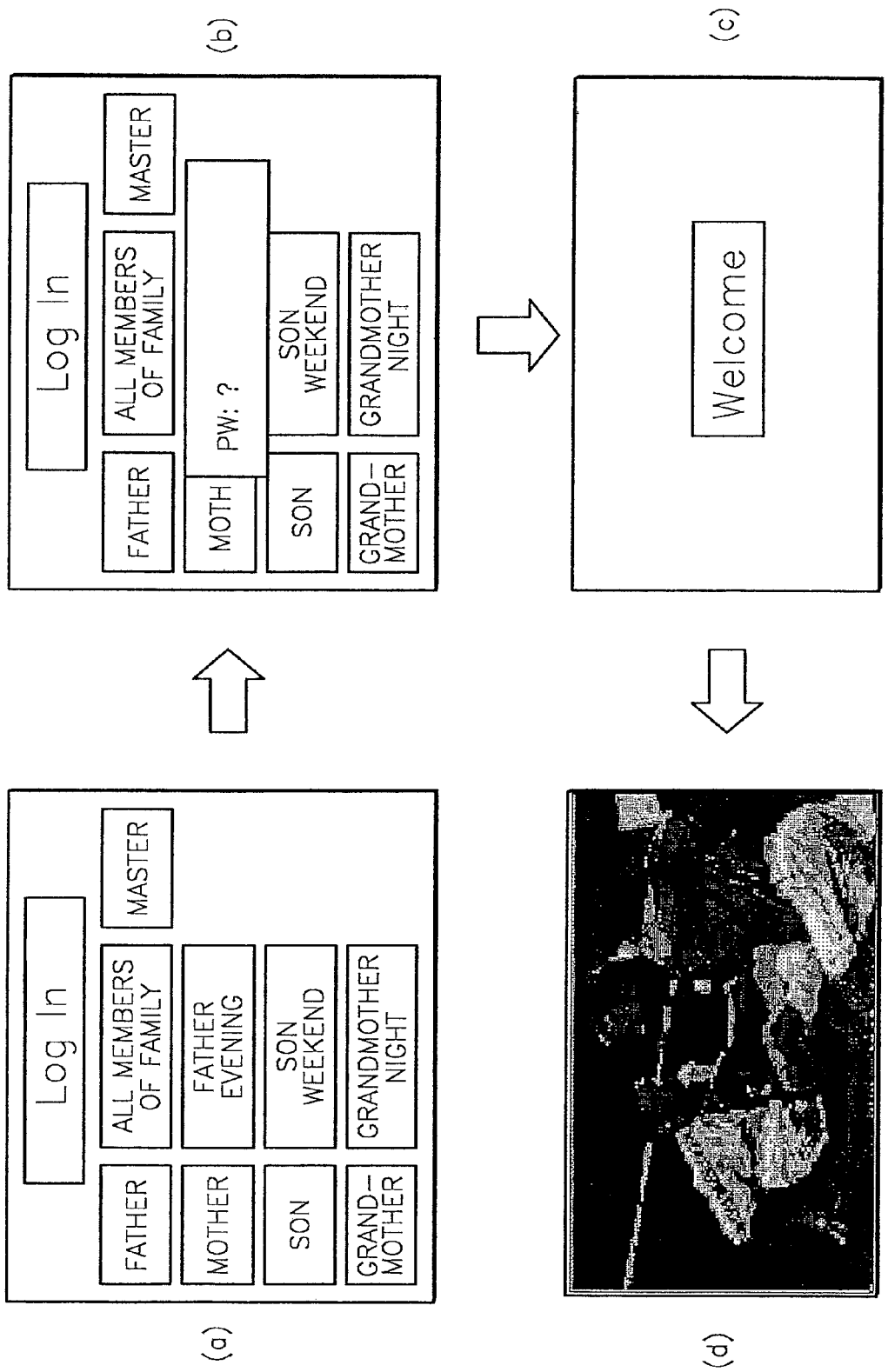

METHOD FOR SETTING TV ENVIRONMENT THROUGH USER AUTHENTICATION AND APPARATUS THEREOF

CROSS-REFERENCE TO RELATED APPLICATIONS

This application is a U.S. continuation application filed under 37 CFR 1.53(b) claiming priority benefit of U.S. application Ser. No. 10/202,636 filed in the United States on Jul. 25, 2002, which claims earlier priority benefit to Korean Patent Application No. 2001-78180 filed with the Korean Intellectual Property Office on Dec. 11, 2001 the disclosures of which are incorporated herein by reference.

BACKGROUND

1. Field

The present invention relates generally to a digital television (TV) system, and more particularly, to a method and apparatus for setting a TV environment in which a TV operation environment is set for each user through user authentication.

2. Description of the Related Art

In general, a TV system is a system that enables TV viewers to watch TV programs by processing broadcast signals containing the TV programs. The TV that is rapidly being developed is a multimedia apparatus where TV viewers can access a variety of information, regardless of age or general authority to access the same.

Recently, solid security has been demanded in apparatuses transmitting or storing a lot of information, such as computers. In the future, when digital TVs become more sophisticated with Internet access functions, security of information will then be a requisite. Particularly, there is a need to restrict access to harmful channels, e.g., restricting teens from watching particular TV programs. Thus, an accurate recognition of users is needed.

In addition, because of differences in age of users, or technological knowledge, there is a need for a more effective way of setting different channels or TV environments, e.g., standard volume states, image states, or sound effects.

Conventional TV systems have employed a method where a user environment is accessed through an On Screen Display (OSD) technique while the TV is turned on. Every user who wants to watch the TV turns on the TV and sets a preferred environment or selects a prestored user environment.

However, this conventional user environment setting includes problems. First, it is inconvenient for every user who wants to watch the TV to have to turn on the TV and set a preferred environment or select a prestored user environment. Second, it is necessary to have a separate menu to control security for information.

SUMMARY OF THE INVENTION

To solve the above problems, it is an object of the present invention to provide a method of setting a TV environment for each user, where user convenience is accomplished by enabling an easy conversion of operation environments and preferred channel settings through user authentication, to satisfy a user's taste and preference in advance before watching the TV.

It is another object of the present invention to provide an apparatus to set a TV environment for each user, such that an operation environment and preferred channel setting are enabled, through user authentication, so as to satisfy the user's taste and preference in advance before watching the TV.

Additional objects and advantages of the invention will be set forth in part in the description which follows and, in part, will be obvious from the description, or may be learned by practice of the invention.

To accomplish the above and other objects, an embodiment of the present invention provides for a method of setting a user environment of a television (TV), including displaying a plurality of icons of Identifications (IDs) for respective users, with each of the IDs corresponding to an operation environment for a particular user. If an ID icon is selected among the displayed icons, a password is required to be authenticated corresponding to the selected ID icon. If the user is authenticated by the password, a preset operation mode for that user is then enabled.

To accomplish the above and other objects, an embodiment of the present invention provides for an apparatus to enable a user environment of the TV, including an input unit to generate an ID and password for each user, a memory unit to set operation environment parameters for each user for each user ID, and to store the parameters, a signal output unit to output a TV signal, and a control unit to receive an ID and password from the input unit, process user authentication, and set output signals of the signal output unit to environment parameters for each user stored in the memory unit.

BRIEF DESCRIPTION OF THE DRAWINGS

These and other objects and advantages of the invention will become more apparent and more readily appreciated from the following description of the preferred embodiments, taken in conjunction with the accompanying drawings of which:

FIG. 3 is a diagram of a further embodiment of the present invention showing a method of setting a TV environment on a screen.

DETAILED DESCRIPTION OF THE PREFERRED EMBODIMENTS

Figure 1:
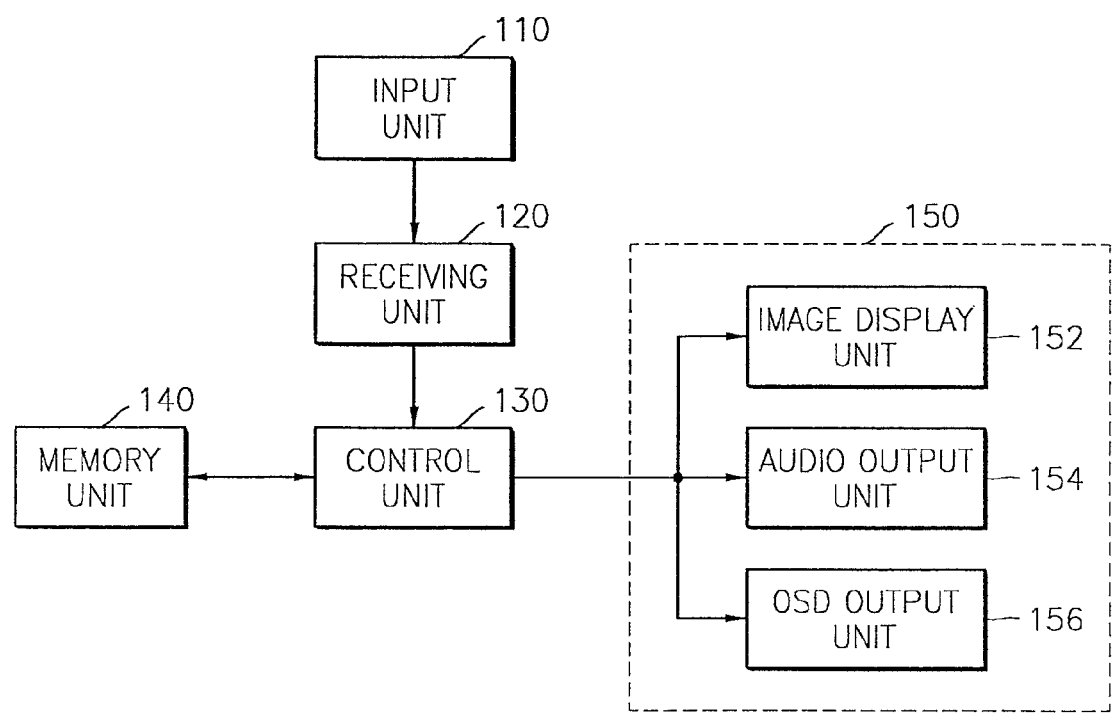
FIG. 1 is a block diagram of an embodiment of the present invention for setting a TV environment.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an embodiment of the present invention for setting a TV environment, including an input unit 110, a receiving unit 120, a control unit 130, a memory unit 140, and a signal output unit 150. The signal output unit 150 includes an image output unit 152, an audio output unit 154, and an OSD output unit 156.

Referring to FIG. 1, the input unit 110 may correspond to a remote controller, through which a user inputs the user's own proper number (hereinafter referred to as "ID") and a password in order to set a desired environment.

The receiving unit 120 may receive the ID and password from the input unit 110 wirelessly or via wire.

The memory unit 140 stores operation environment parameters for each user, for example, a picture quality, color preference, sound effect, an OSD location, and preferred channel list information.

The control unit 130 processes user authentication by receiving the ID and password from the input unit 110. If the user's password is the same as a prestored code, the control unit 130 sets signal output parameters of the elements of the signal output unit 150, that is, the image output unit 152, the audio output unit 154, and the OSD output unit 156, to environment parameters for each user stored in the memory unit 140. Also, the control unit 130 sets a channel according to a preferred channel list stored in the memory unit 140. In addition, the control unit 130 issues an ID for each user through a master ID, sets authorization rights for access to particular channels, and displays a plurality of user IDs as icons on the screen in an initial user environment mode.

Figure 2:
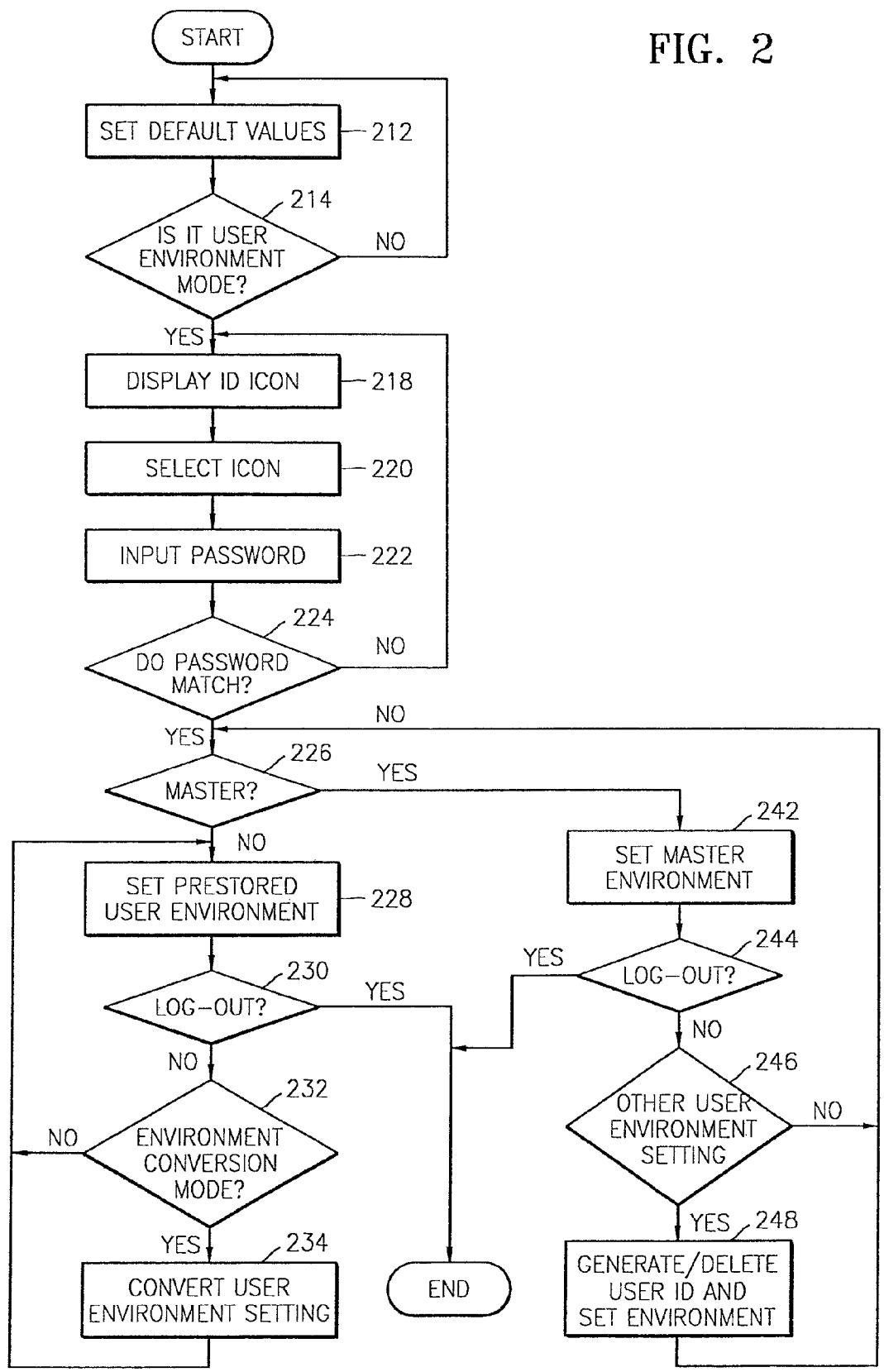
FIG. 2 is a flowchart of an embodiment of the present invention for setting a TV environment.

FIG. 2 is a flowchart of an embodiment of the present invention for setting a TV environment.

First, a master ID, which manages IDs and passwords of all users, is set in an initial phase, in step 212. Using the master ID, an ID and operation environment for each user can be stored in the memory. Examples of the operation environment include a preferred channel list, sound effect, volume level, and a screen state that the user prefers, though it is not limited thereto.

Then, when power is provided, the TV operates in the operation environment of a channel that is set to default values.

Next, it is determined whether or not a user environment mode key is input, in step 214.

Next, if the user environment mode key is input, each of the IDs for users are displayed in the form of icons, in step 218. An example of this is shown as section (a) of FIG. 3. That is, on the screen, ID icons for "father", "mother", "son", "grandmother", "all members of family", and "MASTER" are displayed. At this time, "MASTER" manages all IDs displayed on the screen.

Next, if the user selects a desired ID icon, in step 220, a scene requesting the user to input the user's password is displayed. An example of this is shown as section (b) of FIG. 3.

If the user selects an icon "father evening," a scene requesting the password for the icon is displayed. At this time, in a further embodiment, instead of displaying the ID icon on the screen, the user may request a password input scene by inputting the user's ID to the input terminal of the TV. At this time, with one user ID, a plurality of users can access the TV. For example, the ID "all members of family," as shown in section (a) of FIG. 3, can be shared by a plurality of authenticated users. Also, one user can access the TV with a plurality of IDs. For example, as shown in section (a) of FIG. 3, a plurality of IDs such as "father" and "father evening" can be used by one user.

Next, if the user inputs a password, in step 222 of FIG. 2, it is determined whether or not the input password is correct, in step 224. At this time, if the password input by the user is not the same as a stored code, the scene displaying ID icons appears again.

If the password input by the user is the same as the stored code, an acceptance scene, as illustrated in section (c) of FIG. 3, is displayed.

Next, if the password authentication is successfully finished, the TV environment is set to a user environment that is stored in memory, in step 228 of FIG. 2. If the user logs out, in step 230, the user environment is terminated, and a scene of the default environment setting is executed. At this time, in another embodiment, if the authentication is successfully finished, preferred channel lists set for respective users may be displayed.

At this time instead of logging out, if a user environment conversion key is input, in step 232, the previous user environment stored in memory is converted into another environment, in step 234.

Meanwhile, if the authenticated password is the master ID, in step 226, the master environment for managing all user IDs and passwords is set, in step 242. At this time instead of logging out, in step 244, if another user environment setting key is input, in step 246, the master generates an ID for the other users and sets environments for the user, in step 248. Also, the master may delete user IDs and environments.

The present invention may be embodied in code, which can be read by a computer, e.g., on a computer readable recording medium or transmitted to the computer in carrier waves, noting that code may include applets performing portions of the present invention or an entire program for controlling the computer to perform the present invention. The computer readable recording medium may also include all kinds of recording apparatuses on which computer readable data are stored.

The computer readable recording media can include storage media such as magnetic storage media (e.g., ROMs, floppy disks, hard disks, etc.), optically readable media (e.g., CD-ROMs, DVDs, etc.) and the aforementioned carrier waves (e.g., transmissions over the Internet or an Intranet). Also, the computer readable recording media can be scattered on computer systems connected through a network and can store and execute a computer readable code in a distributed mode.

As described above, according to embodiments of the present invention, preferred channels, sound effects, volume levels, and screen states that a user likes are stored in advance, and through authentication, the preset environment can be protected from other users access. For a family with children, the children can be protected from harmful channels. Also, since the master ID manages all the user IDs and passwords, a plurality of people can access a user environment with one ID.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of providing a personalized user environment for a media device comprising a screen, a memory and a processor, the method comprising:
   registering at least one user account for at least one user;
   defining at least one personalized user setting associated with the at least one user account;
   storing the at least one user account and operation parameters for the at least one personalized user setting in the memory;
   displaying a login request to a user on the screen;
   receiving the login information from the user and comparing the received login information with the stored at least one user account;
   activating a particular one of the at least one user account if the received login information matches with one of the at least one stored user account;
   loading the at least one defined personalized user setting associated with the matched user account on the media device;
   applying the at least one personalized user setting on the media device;

displaying media content, by the media device, in the at least one personalized user setting; and changing the applied personalized setting to a default user setting if a logout by the user is detected.

* * * * *